(12) United States Patent
Nishida et al.

(10) Patent No.: US 8,425,360 B2
(45) Date of Patent: Apr. 23, 2013

(54) PLANETARY BEARING STRUCTURE (75) Inventors: Hideaki Nishida, Tokyo (JP); Shuichi Isayama, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 70 days.

(21) Appl. No.: 12/995,069

(22) PCT Filed: Aug. 20, 2010

(86) PCT No.: PCT/JP2010/064039
§ 371 (c)(1),
(2), (4) Date: Nov. 29, 2010

(87) PCT Pub. No.: WO2011/024712
PCT Pub. Date: Mar. 3, 2011

(65) Prior Publication Data
US 2011/0172048 A1 Jul. 14, 2011

(30) Foreign Application Priority Data
Aug. 26, 2009 (JP) ................................ 2009-195750

(51) Int. Cl.
*F16H 57/04* (2010.01)
(52) U.S. Cl.
USPC ........................................ 475/159; 475/160
(58) Field of Classification Search .................. 475/159, 475/160
See application file for complete search history.

(56) References Cited

U.S. PATENT DOCUMENTS
5,472,383 A 12/1995 McKibbin
5,976,048 A * 11/1999 Sudau et al. .................. 475/159
(Continued)

FOREIGN PATENT DOCUMENTS
EP 0210119 A1 1/1987
JP 61094649 U 6/1986
(Continued)

OTHER PUBLICATIONS
ISR for PCT/JP2010/064039 dated Nov. 9, 2010.
(Continued)

*Primary Examiner* — David D Le
*Assistant Examiner* — Derek D Knight
(74) *Attorney, Agent, or Firm* — Kanesaka Berner & Partners, LLP (57) ABSTRACT

A planetary bearing structure which does not require forcible oil supply of planetary bearing using slide bearing, and which can reliably supply oil to a sliding surface and lubricate the sliding surface with a simple structure. The planetary bearing structure including: a planetary pin (30) fixed to a carrier (21), and a planetary gear (40) having a slide bearing (50) mounted on an inner peripheral surface of a shaft hole (40*a*), in which the planetary pin (30) turnably supports the planetary gear (40) through the slide bearing (50), and both end surfaces (41L, 41R) of the planetary gear (40) form a pair of gaps (SL, SR) between opposed wall surfaces (21L, 21R) of the carrier (21) and rotate, wherein a pair of spiral grooves (42L, 42R) formed in one of the gear end surfaces (41, 41R) forming the pair of gaps (SL, SR) and the opposed wall surfaces (21L, 21R) and oppositely oriented at gaps (SL, SR), and the planetary bearing structure has such a lubricant oil passage that the gaps (SL, SR) take an oil bath in lubricant oil, lubricant oil introduced from the sucking side gap (SR) passes between the planetary pin (30) and the slide bearing (50) and is discharged from the other discharging side gap (SL).

8 Claims, 10 Drawing Sheets

U.S. PATENT DOCUMENTS 6,220,758 B1 * 4/2001 Ono et al. .................... 384/286
6,726,215 B2   4/2004 Uesugi et al.

FOREIGN PATENT DOCUMENTS

| JP | 4-110257 U    |   | 9/1992  |
|----|---------------|---|---------|
| JP | 07317885 A    | * | 12/1995 |
| JP | 7317885 A     |   | 12/1995 |
| JP | 9507284 A     |   | 7/1997  |
| JP | 2003056719 A  |   | 2/2003  |
| JP | 3649444 B2    |   | 5/2005  |
| JP | 2007263357 A  |   | 10/2007 |
| JP | 2008202746 A  |   | 9/2008  |

OTHER PUBLICATIONS

European Search Report issued on Feb. 13, 2013 in corresponding European Patent Application No. 10 811 762.3.

* cited by examiner

PLANETARY BEARING STRUCTURE

RELATED APPLICATIONS

The present application is a national phase of PCT/JP2010/64039 and is based on, and claims priority from, Japanese Application Number 2009-195750, filed Aug. 26, 2009.

TECHNICAL FIELD

The present invention relates to a planetary bearing structure which is applied to a gear box and the like of a wind power generator for example.

BACKGROUND ART

The wind power generator is an apparatus in which a rotor head having wind turbine blades receive a wind force and the rotor head rotates, this rotation is accelerated by a gear box, thereby driving a generator, and the generator generates electric power.

As the gear box which accelerates the rotation of the rotor head, there is a planetary gear box mechanism for example. The planetary gear box mechanism includes a plurality of planetary gears mounted on a carrier which integrally rotates with an input shaft, the planetary gears mesh with a sun gear which integrally rotates with an output shaft and with an internal gear fixed to a housing of the gear box, and the planetary gears revolve. That is, the planetary gear box mechanism increases the number of rotations (revolutions of the planetary gear) of the carrier connected to the input shaft in accordance with gear ratios which were set for the planetary gears, the sun gear and the internal gear, and the planetary gear box mechanism outputs rotation from the output shaft of the sun gear which rotates in accordance with the increased number of rotations.

The planetary gears of the planetary gear box mechanism are turnably supported by the carrier through planetary bearings, respectively. A rolling bearing or a slide bearing is usually used as the planetary bearing.

When the rolling bearing is used as the planetary bearing, a bearing section is lubricated using an oil bath. This oil bath utilizes a fact that whenever the carrier rotates once, the planetary gear once passes through lubricant oil stored in a lower portion in the housing.

When the slide bearing is used as the planetary bearing, it is usually necessary to forcibly supply oil to the bearing section. That is, a lubricating structure which reliably supplies lubricant oil to a sliding surface of the bearing section using a lubricant oil pump or the like.

As a lubricating structure of a vehicular speed reducer, there is disclosed a spiral lubricant oil passage which is located in a motor-side rotating member, and which spirally extends in a direction opposite from a rotation direction of the motor-side rotating member toward a flowing direction of lubricant oil (see FIG. 1 and the like of patent document 1 for example).

CITATION LIST

Patent Literature

{PTL 1} Japanese Unexamined Patent Application, Publication No. 2008-202746

SUMMARY OF INVENTION

Technical Problem

As described above, if the slide bearing is used as the planetary bearing, it is necessary to forcibly supply oil. Therefore, to forcibly supply oil, it is necessary to form a lubricant oil pump and a complicated oil-supply passage. Therefore, the forcible lubrication complicates the lubricating structure and increases the number of operation steps required for a machining operation. For this reason, the forcible lubrication is not preferable because the forcible lubrication becomes a factor in increasing a cost of the planetary bearing.

The present invention is accomplished in view of the above circumstances, and in a planetary bearing using a slide bearing as a bearing section, it is an object of the invention to provide a planetary bearing structure which does not require the forcible oil supply, and which can reliably supply oil to a sliding surface and can lubricate the sliding surface with a simple configuration.

Solution to Problem

To achieve the above object, the following means is employed.

A first aspect or the present invention provides a planetary bearing structure including: a planetary pin fixed to a carrier, and a planetary gear having a slide bearing mounted on an inner peripheral surface of a shaft hole, in which the planetary pin turnably supports the planetary gear through the slide bearing, and both end surfaces of the planetary gear form a pair of gaps between opposed wall surfaces of the carrier and rotate, wherein a pair of oppositely oriented spiral grooves are formed in one of the gear end surface forming the pair of gaps and the opposed wall surfaces, and the planetary bearing structure has such a lubricant oil passage that when the gaps take an oil bath in lubricant oil by rotation of the carrier, lubricant oil introduced from the one sucking side gap passes between the planetary pin and the slide bearing and is discharged from the other discharging side gap.

According to the planetary bearing structure, the pair of oppositely oriented spiral grooves are formed in one of the gear end surface forming the gaps and the opposed wall surfaces, and the planetary bearing structure has such the lubricant oil passage that when the gaps take the oil bath in lubricant oil by rotation of the carrier, lubricant oil introduced from the one sucking side gap passes between the planetary pin and the slide bearing and is discharged from the other discharging side gap. Therefore, the planetary bearing structure takes the oil bath in the lubricant oil, the oppositely oriented spiral grooves provided for each of the pair of gaps form a flow sucking the lubricant oil into the gap by the one sucking side gap, and forms a flow discharging (flowing out) the lubricant oil outside the gap by the other discharging side gap by the rotation of the planetary gear. Therefore, in a state where the planetary bearing structure takes the oil bath in the lubricant oil, the oppositely oriented spiral grooves play the same role as that of the lubrication oil pump. Thus, it is possible to reliably supply lubricant oil to the slide bearing disposed between the planetary pin and the planetary gear and to lubricate the slide bearing.

In this case, the spiral grooves for the pair of gaps may be formed in any of a combination of the gear end surfaces of the planetary gear, a combination of the opposed wall surfaces on the side of the carrier, and a combination of the gear end surface on the one side of the gap and the opposed wall surfaces on the side of the other gap.

In the planetary bearing structure of the first aspect of the invention, it is preferable that the planetary bearing structure further includes a pair of circumferential grooves which are formed in an outer peripheral surface of the planetary pin at positions in an axial direction substantially matching with the gaps and which are continuous in a circumferential direction, and an oil supply groove which is formed in the outer peripheral surface of the planetary pin in the axial direction such that the oil supply groove connects the circumferential grooves with each other. According to this, lubricant oil can easily flow between the outer peripheral surface of the planetary pin and the sliding surface of the slide bearing, and it is possible to more reliably supply lubricant oil.

In this case, it is preferable that the oil supply groove is inclined in a rotation direction of the planetary gear from the inlet side gap to the outlet side gap. According to this, lubricant oil which is sucked from the one sucking side gap and flows out from the other discharging side gap flows more smoothly.

A second aspect of the present invention provides a planetary bearing structure including: a planetary pin fixed to a carrier, and a planetary gear having a slide bearing mounted on an inner peripheral surface of a shaft hole, in which the planetary pin turnably supports the planetary gear through the slide bearing, and both end surfaces of the planetary gear form a pair of gaps between opposed wall surfaces of the carrier and rotate, wherein a pair of spiral grooves are formed, as suction side gaps, in one of the gear end surface forming the gaps and the opposed wall surfaces, the spiral grooves being oriented in the same direction as the gaps, formed in an outer peripheral surface of the planetary pin are a pair of circumferential grooves which are formed at positions in an axial direction substantially matching with the gaps and which are continuous in a circumferential direction, a drain oil groove which is formed at an intermediate position of the circumferential grooves and which is continuous in the circumferential direction, and a herringbone groove which connects the circumferential groove and the drain oil groove with each other, a plurality of drain oil holes radially penetrate through the drain oil groove from a drain oil flow path penetrating through the planetary pin at is axially center position, and the planetary bearing structure has such a lubricant oil passage that when the gaps take an oil bath in lubricant oil by rotation of the carrier, lubricant oil introduced from the sucking side gap passes through the herringbone groove from the circumferential groove and flows into the drain oil groove and then, the lubricant oil is discharged from the drain oil hole through the drain oil flow path.

According to this planetary bearing structure, the pair of spiral grooves are formed, as suction side gaps, in one of the gear end surface forming the gaps and the opposed wall surfaces, the spiral grooves being oriented in the same direction as the gaps, formed in the outer peripheral surface of the planetary pin are the pair of circumferential grooves which are formed at positions in the axial direction substantially matching with the gaps and which are continuous in the circumferential direction, the drain oil groove which is formed at the intermediate position of the circumferential groove and which is continuous in the circumferential direction, and the herringbone groove which connects the circumferential groove and the drain oil groove with each other, the plurality of drain oil hole radially penetrate through the drain oil groove from the drain oil flow path penetrating through the planetary pin at is axially center position, and the planetary bearing structure has such the lubricant oil passage that when the gaps take the oil bath in lubricant oil by rotation of the carrier, lubricant oil introduced from the sucking side gap passes through the herringbone groove from the circumferential groove and flows into the drain oil groove and then, the lubricant oil is discharged from the drain oil hole through the drain oil flow path. Since the planetary bearing structure takes the oil bath in the lubricant oil, the amount of lubricant oil which is sucked from the pair of sucking side gaps and supplied to the lubricant oil passage can be increased. The herringbone is formed on the outer peripheral surface of the planetary pin, this is introduced into the drain oil hole of the drain oil groove, lubricant oil is substantially uniformly supplied between the outer peripheral surface of the planetary pin and the sliding surface of the slide bearing over the entire periphery, and it is possible to reliably lubricate.

In the first or second aspect of the present invention, preferably, cross-sectional areas of the spiral grooves are gradually reduced in a sucking direction or a discharging direction of lubricant oil. According to this, the pump function to form the flow of lubricant oil by the spiral grooves is further enhanced.

In the first or second aspect of the present invention, preferably, the spiral grooves are formed as members which are separate from the gear end surfaces or the opposed wall surfaces. According to this, it becomes easy to form the spiral grooves, and the producing cost can be reduced. An example of suitable separate member forming the spiral groove is resin such as PEEK (polyetheretherketone) and PTFE (polytetrafluoroethylene).

Advantageous Effects of Invention

According to the present invention, since lubricant oil is supplied utilizing the pump function formed by the spiral grooves, the forcible oil supply using the conventional lubricant oil pump is not required to lubricate the planetary bearing using the slide bearing as the bearing section. That is, with the easy and simple configuration, i.e., by forming the spiral grooves in one surface of the groove formed between the carrier and the planetary gear, it is possible to obtain the pump function to take in lubricant oil when taking the oil bath and discharging the lubricant oil. Therefore, it is possible to inexpensively provide the planetary bearing structure which can reliably supply oil to the sliding surface and lubricate the sliding surface.

Therefore, if the planetary bearing structure is applied to a gear box or the like of a wind power generator, costs of the gear box and the wind power generator can be reduced, and this is effective to enhance the reliability and durability by the reliable lubrication.

DESCRIPTION OF EMBODIMENTS

An Embodiment of a planetary bearing structure according to the present invention will be described based on the drawings.

<First Embodiment>

The planetary bearing structure of the invention is suitable for a gear box of a wind power generator for example. A wind power generator 1 shown in FIG. 5 includes a tower (also called "column") 2 standing on a foundation B, a nacelle 3 placed on an upper end of the tower 2, and a rotor head 4 which is supported such that it can rotate around its rotation axis in a substantially horizontal lateral direction. The rotor head 4 is provided on the side of a front end of the nacelle 3.

Figure 5:
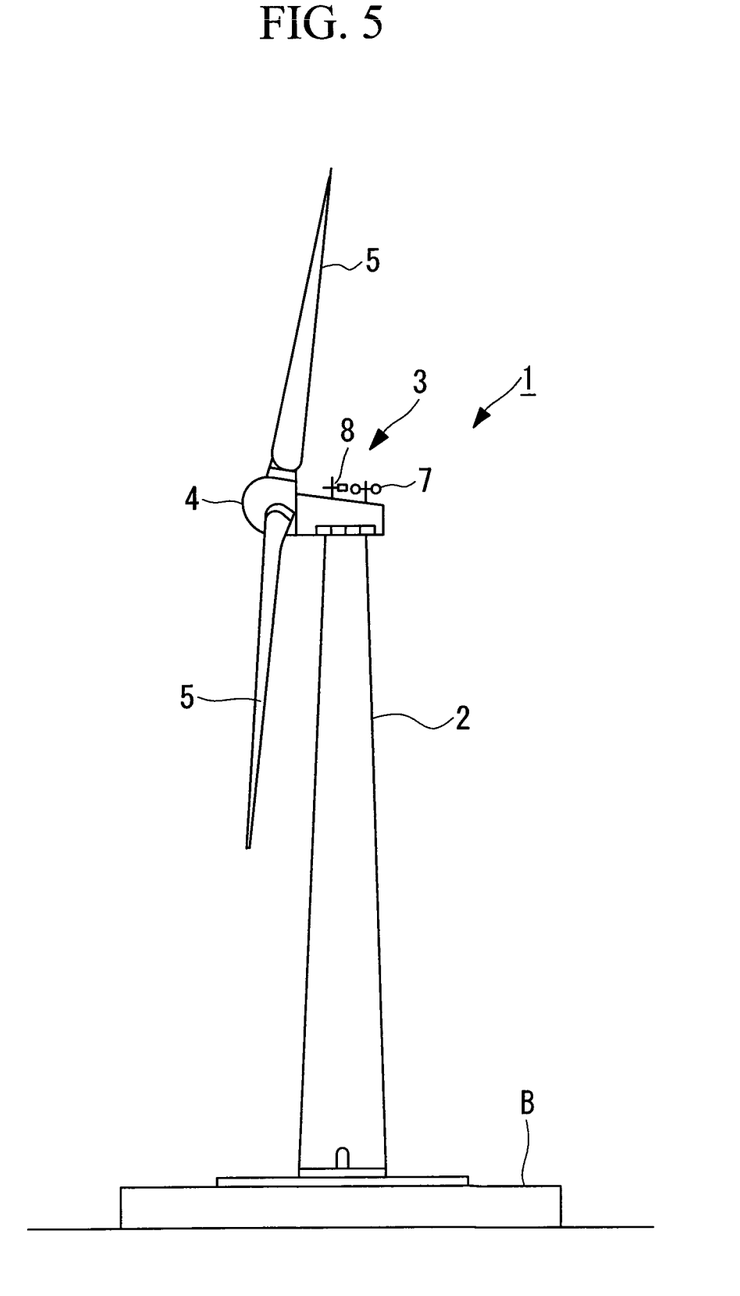
FIG. 5 is a side view showing a wind power generator in which the planetary bearing structure of the invention is applied to a gear box.

A plurality of (e.g., three) wind turbine blades 5 are mounted radially around its rotation axis on the rotor head 4. According to this, a force of wind which hits the wind turbine blades 5 from the rotation axis of the rotor head 4 is converted into a power which rotates the rotor head 4 around its rotation axis.

An anemometer 7 which measures a peripheral wind speed and an anemoscope 8 which measures a wind direction are disposed on appropriate positions (e.g., upper portion) of an outer peripheral surface of the nacelle 3.

Figure 6:
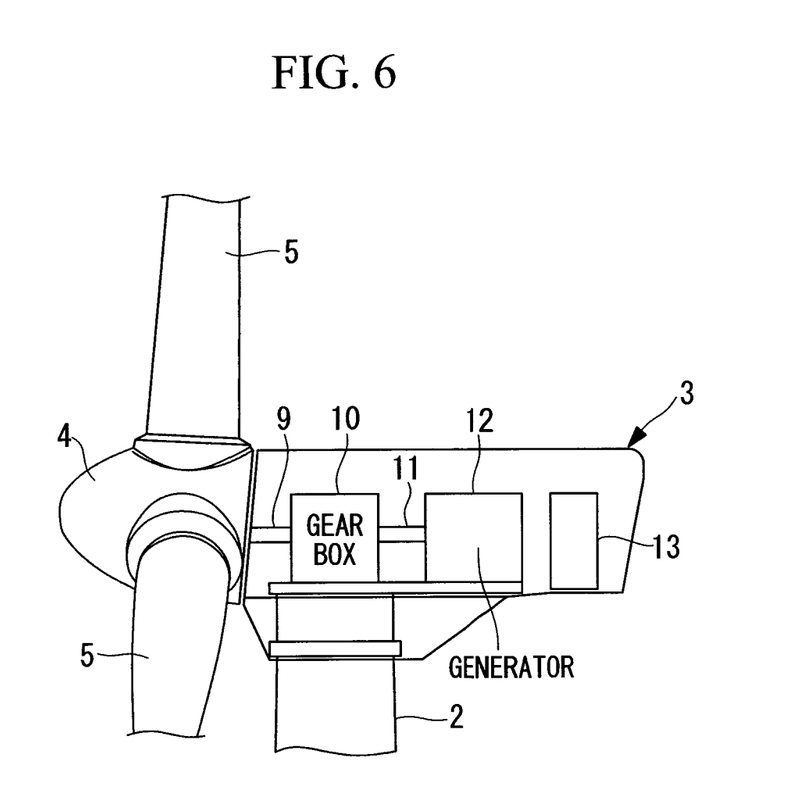
FIG. 6 is a sectional view of an essential portion showing a schematic example of a structure in a nacelle of the wind power generator shown in FIG. 5.

As shown in FIG. 6 for example, a gear box 10 connected to the rotor head 4 through a main shaft 9, and a generator 12 connected to an output shaft 11 of the gear box 10 are disposed in the nacelle 3. That is, the number of rotations of the rotor head 4 is transmitted to the gear box 10 connected through the main shaft 9, and the number of rotations is increased on the side of the output shaft 11 of the gear box 10. The generator 12 is driven by the number of rotations on the output power side which was increased in speed through the gear box 10 and according to this, electricity generated by the generator 12 can be obtained.

A wind turbine controller 13 which controls various operations of the wind power generator 1 is provided in the nacelle 3.

The gear box 10 usually includes a combination of a plurality of gear box mechanisms, and the number of rotations of the main shaft 9 which is an input shaft is increased to the final output number of rotations of the output shaft 11 through a plurality of speed increasing stages.

Figure 2:
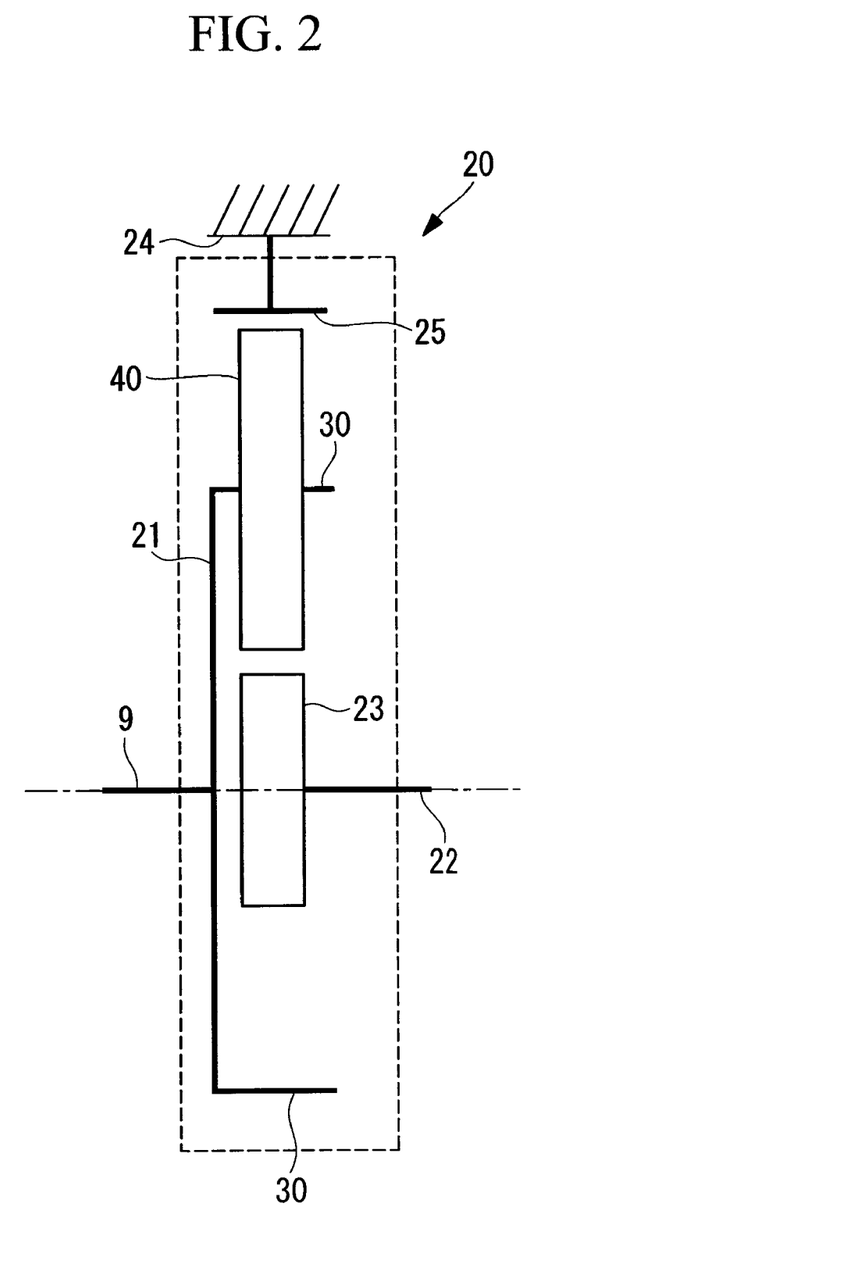
FIG. 2 is a diagram showing a general outline of a planetary gear box as one example of a planetary gear device to which the planetary bearing structure of the invention is applied.
Figure 3:
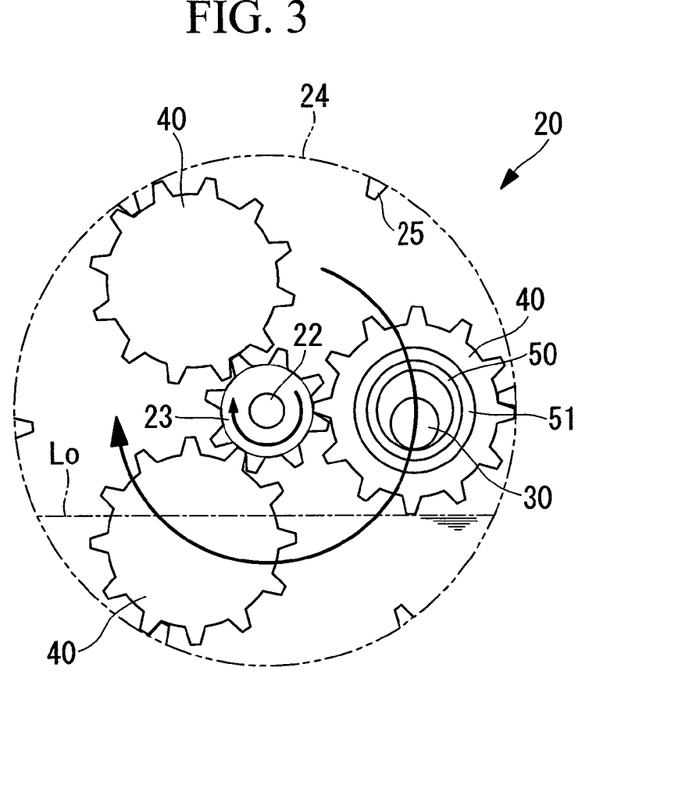
FIG. 3 is a schematic diagram showing a configuration of the planetary gear box shown in FIG. 2 as viewed from an axial direction thereof.

FIGS. 2 and 3 show a general outline of a planetary gear device ("planetary gear box", hereinafter) 20 which carries out a first speed-increasing operation of the gear box 10 as one example of the planetary gear device to which the planetary bearing structure of the invention is applied. When the planetary gear box 20 is used as a gear box of the wind power generator 1, a carrier 21 is connected to the main shaft 9 and rotated. In the illustrated configuration example, three planetary pins 30 are fixed to the carrier 21, a slide bearing 50 is rotatably connected to each of the planetary pins 30. A planetary gear 40 is also rotatably connected to each of the planetary pins 30 through a bearing back metal 51 of the slide bearing 50.

A relation (a difference between an inner diameter and an outer diameter) between the planetary pin 30 and the slide bearing 50 in FIG. 3 is exaggerated as compared with the actual relation for the sake of convenience of presentation.

The planetary gear box 20 includes the three planetary gears 40 mounted on the carrier 21 which integrally rotates with the main shaft 9 which becomes an input shaft. The planetary gears 40 mesh with the sun gear 23 which integrally rotates with an output shaft 22 and with an internal gear 25 fixed to a housing 24, and the planetary gears 40 revolve. That is, the planetary gear box 20 increases the number of rotations (revolution of the planetary gear) of the carrier 21 connected to the main shaft (input shaft) 9 in accordance with gear ratios which were set for the planetary gears 40, the sun gear 23 and the internal gear 25. The increased number of rotations is output to two stage gear box mechanism (not shown) from the output shaft 22 connected to the sun gear 23.

Lubricant oil is stored in the housing 24 in which the planetary gears 40 revolve together with the carrier 21. The lubricant oil is stored up to a lubricant oil surface Lo shown in FIG. 3 for example. It is preferable that the lubricant oil surface Lo has such a depth that at least shaft holes 40a of the revolving planetary gear 40 can take an oil bath in the lubricant oil.

Figure 1A:
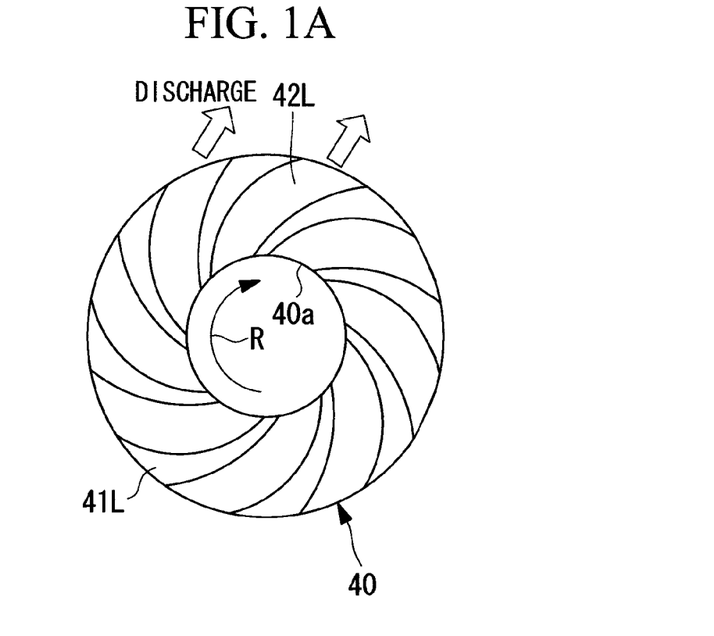
FIG. 1A shows a first embodiment of a planetary bearing structure according to the present invention, and is a left side view of a planetary gear shown in FIG. 1B.
Figure 1B:
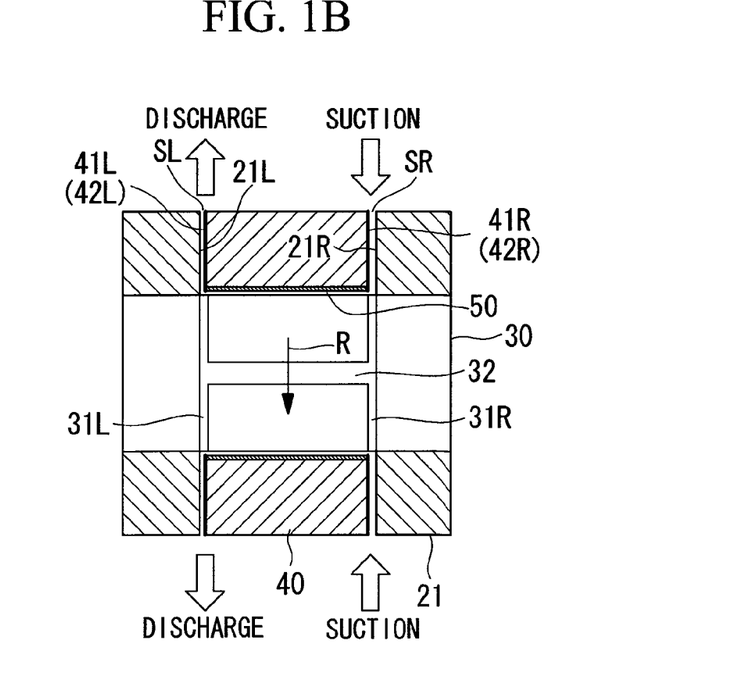
FIG. 1B shows the first embodiment of the planetary bearing structure of the invention, and is a sectional view of an essential portion showing the planetary bearing structure.
Figure 1C:
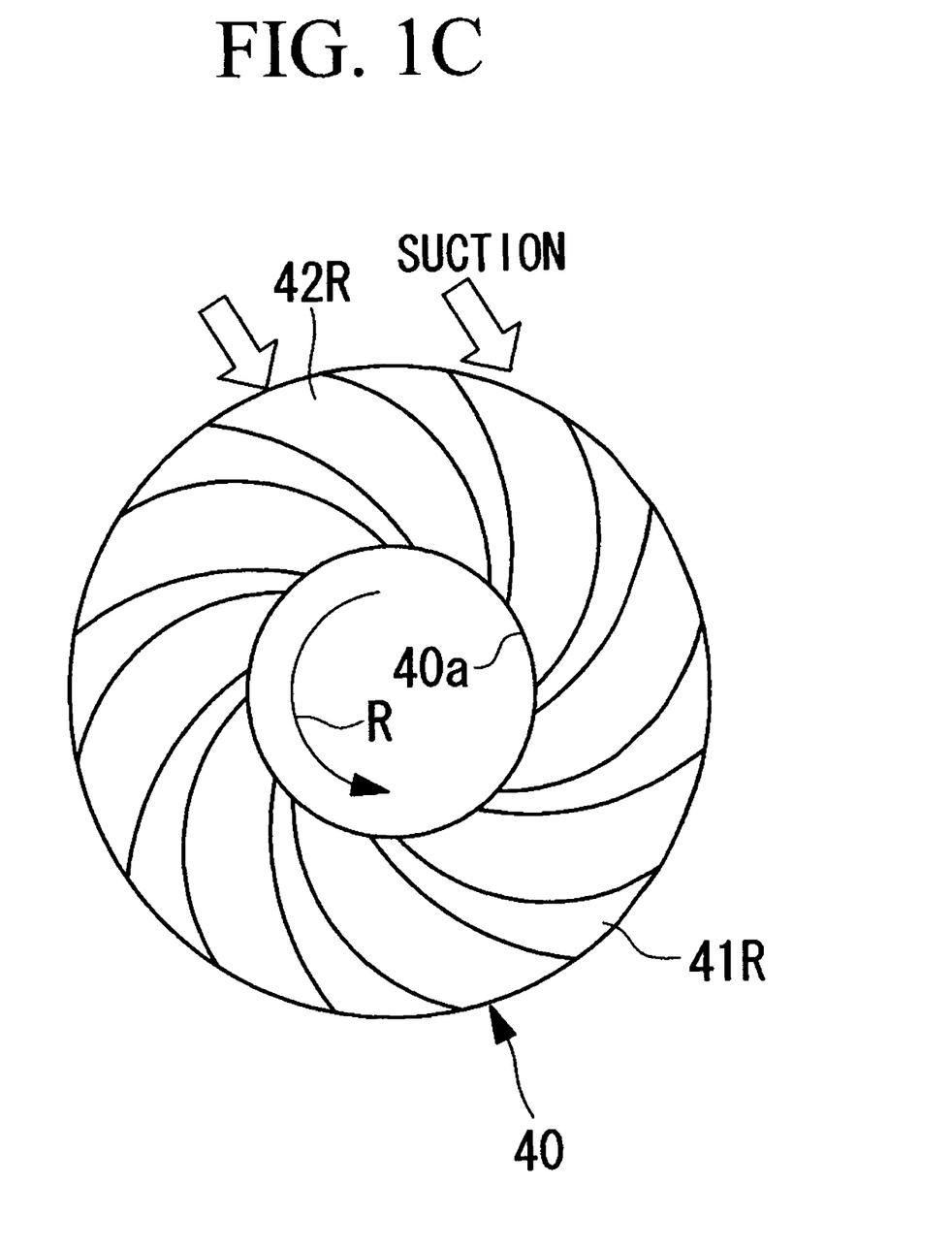
FIG. 1C shows the first embodiment of a planetary bearing structure according to the present invention, and is a right side view of a planetary gear shown in FIG. 1B.

As shown in FIGS. 1A, 1B and 1C for example, the planetary gear box 20 includes such a planetary bearing structure that planetary pins 30 rotatably support the planetary gears 40. That is, the illustrated planetary bearing structure includes the planetary pins 30 fixed to the carrier 21, and the planetary gears 40 having the slide bearings 50 mounted on inner peripheral surfaces of the shaft holes 40a, and the planetary pins 30 turnably support the planetary gears 40 through the slide bearings 50. Each of the slide bearings 50 in this case has such a structure that PEEK (polyetheretherketone) resin is pasted on an inner peripheral surface of the bearing back metal 51 for example.

According to the illustrated planetary bearing structure, left and right gear end surfaces 41L and 41R which are both ends of the planetary gear 40 form a pair of left and right gaps SL and SR between opposed wall surfaces 21L and 21R of the carrier 21 and rotate. The gaps SL and SR are very small gaps which are set such that the gear end surfaces 41L and 41R of the planetary gear 40 can rotate without interfering with the carrier 21. In this embodiment, left and right denote direction of a paper surface of the planetary gear 40 shown in FIG. 1B for example.

In such a planetary bearing structure, the gear end surfaces 41L and 41R forming the pair of left and right gaps SL and SR include spiral grooves 42L and 42R which are oriented in opposite directions at the pair of left and right gaps SL and SR. The spiral grooves 42L and 42R include a plurality of substantially arc spiral grooves in the circumferential direction at an equal pitch from an outer peripheral side of the planetary gear 40 toward an inner peripheral side of the shaft hole 40a. Spirally winding directions of the spiral grooves 42L and 42R formed in the left and right gear end surfaces 41L and 41R are opposite from the rotation direction (see arrows R) of the planetary gear 40 and the slide bearing 50.

Although eight spiral grooves 42L and 42R are respectively formed in the left and right gear end surfaces 41L and 41R in the illustrated configuration example, the invention is not limited to this configuration.

If the gaps SL and SR take the oil bath in the lubricant oil by the rotation of the carrier 21, the spiral grooves 42L and 42R generate a flow of lubricant oil in the very small gaps SL and SR by rotation of the planetary gears 40. At that time, since orientations of the spiral grooves 42L and 42R are opposite from each other in the rotation direction of the planetary gear 40, flowing directions of lubricant oil are also opposite from each other. That is, in the illustrated configuration example, the spiral groove 42R formed in the gear end surface 41R on the right side of the planetary gear 40 forms a flow sucking the lubricant oil from the outer peripheral side in the direction of the shaft hole 40a and simultaneously, the spiral groove 42L formed in the gear end surface 41L on the left side of the planetary gear 40 forms a flow discharging the lubricant oil from the shaft hole 40a toward the direction of the outer periphery.

Therefore, in the planetary bearing structure of the planetary gear 40 which takes an oil bath in the lubricant oil, there is formed such a lubricant oil passage that lubricant oil sucked and introduced from the right gas SR on the suction side passes between the planetary pin 30 and the slide bearing 50 and is discharged from the left gap SL on the discharge side. That is, the spiral grooves 42L and 42R which rotate on one surfaces of the very small gaps SL and SR exhibit a pump function to push the lubricant oil into the lubricant oil passage and supplies the lubricant oil, and a pump function to discharge and suck out lubricant oil which lubricates sliding surfaces between the planetary pin 30 and the slide bearing 50. Thus, it is possible to reliably supply lubricant oil to the slide bearing 50 disposed between the planetary pin 30 and the planetary gear 40, and lubricate the slide bearing 50.

In this case, the spiral grooves 42L and 42R for the pair of left and right gaps SL and SR may be formed in any of a combination of the gear end surfaces 41L and 41R of the planetary gear 40, a combination of the opposed wall surfaces 21L and 21R on the side of the carrier 21, and a combination of the gear end surface (41L or 41R) on the side of the gap SL or SR and one of the opposed wall surfaces (21R or 21L) on the side of the other gap SR or SL. That is, the spiral grooves 42L and 42R are formed on one of the gear end surface 41L forming the gap SL and the wall surface 21L, and one of the gear end surface 41R forming the gap SL and the wall surface 21R, and orientations of the spiral grooves 42L and 42R are opposite from each other at the left and right gaps SL and SR. According to this configuration, it is possible to obtain the pump function to generate a flow which sucks and discharges the lubricant oil by the spiral grooves 42L and 42R which integrally rotate with the planetary gear 40 or by the situation in which the stationary side spiral grooves 42L and 42R rotate relative to the planetary gear 40.

The planetary pin 30 includes a pair of left and right circumferential grooves 31L and 31R which are formed at positions in an axial direction substantially matching with the gaps SL and SR and which are continuous in the circumferential direction, and an oil supply groove 32 formed in the axial direction such as to connect the circumferential grooves 31L and 31R with each other. One oil supply groove 32 may be provided, or a plurality of oil supply grooves 32 may be provided in a circumferential direction of the planetary pin 30 at an equal pitch (e.g., two oil supply grooves 32 may be provided at a pitch of 180°, or four oil supply grooves 32 may be provided at a pitch of 90°).

If the planetary pin 30 of this configuration is employed, lubricant oil is easily supplied between the outer peripheral surface of the planetary pin 30 and the slide surface of the slide bearing 50, a resistance of the flow path of lubricant oil is reduced, and lubricant oil can be supplied more reliably. That is, lubricant oil smoothly flows through the lubricant oil passage, and it is possible to stably supply low temperature lubricant oil and continuously lubricate excellently.

Cross-sectional areas of the spiral grooves 42L and 42R, i.e., cross-sectional areas of flow paths of the spiral grooves 42L and 42R which suck and discharge lubricant oil may be substantially uniform from the outer peripheral side to the inner peripheral side of the planetary gear 40, but it is preferable that the cross-sectional areas are gradually reduced from the outer peripheral side to the inner peripheral side of the planetary gear 40. The cross-sectional areas of this case are defined by groove widths and groove depths of the spiral grooves 42L and 42R. As a specific reduced structure of cross-sectional areas of the flow paths, there are a structure in which the groove depths are the same and the groove widths are gradually narrowed, a structure in which the groove widths are the same and the groove depths become gradually shallower, and a structure in which the groove widths are gradually narrowed and the groove depths become gradually shallower.

The cross-sectional areas of the spiral grooves 42L and 42R are varied such that the cross-sectional areas are gradually reduced from the outer peripheral side to the inner peripheral side in this manner. According to this configuration, since flow of lubricant oil is gradually increased in pressure toward the inner peripheral side, the pump function to form the flow of lubricant oil by the spiral grooves 42L and 42R is further enhanced.

In the embodiment, the spiral grooves 42L and 42R are formed directly in the gear end surfaces or the opposed wall surfaces by machining a metal surface of the planetary gears 40 or the carrier 21. However, since the spiral grooves 42L and 42R are not required to have mechanical strength unlike a gear, it is possible to form the spiral grooves 42L and 42R as separate members 43, and to mount the spiral grooves 42L and 42R on the gear end surfaces 41L and 41R of the planetary gear 40A or the opposed wall surfaces 21L and 21R of the carrier 21 by adhesion as in a modification shown in FIG. 4.

Figure 4:
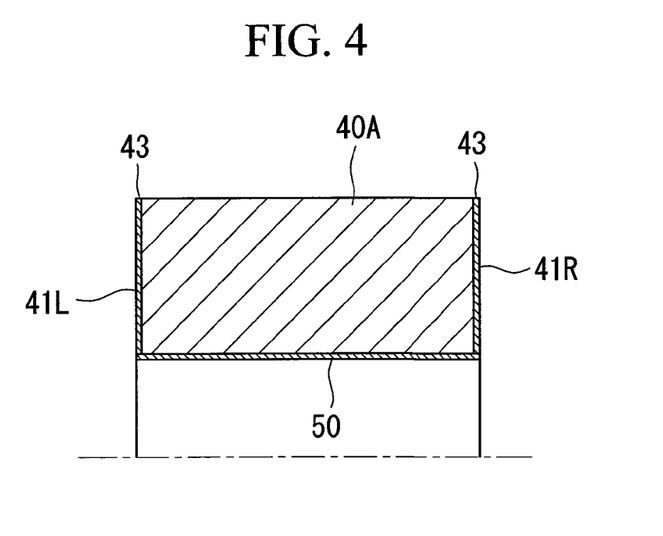
FIG. 4 is a semi-sectional view of an upper portion of a planetary gear of such a structure that a spiral groove formed in a separate member is pasted on an end surface of a gear of the planetary gear as a modification of the structure for providing the spiral groove.

Since the spiral grooves 42L and 42R of the separate structure can be made by resin formation, it is easy to form them as compared with spiral grooves 42L and 42R formed by machining a metal and thus, it is possible to reduce the producing cost. In this case, as preferred separate members 43 forming the spiral grooves 42L and 42R, there are resins such as PEEK (polyetheretherketone) and PTFE (polytetrafluoroethylene). If these resins are used, sliding performance between the gear end surfaces and the opposed wall surfaces of the carrier can be enhanced.

<Second Embodiment>

Figure 7A:
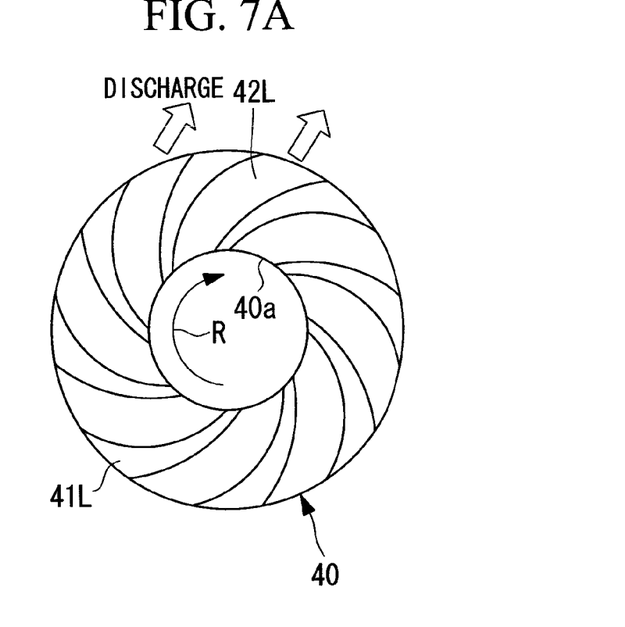
FIG. 7A shows a second embodiment of a planetary bearing structure according to the present invention, and is a left side view of a planetary gear shown in FIG. 7B.
Figure 7B:
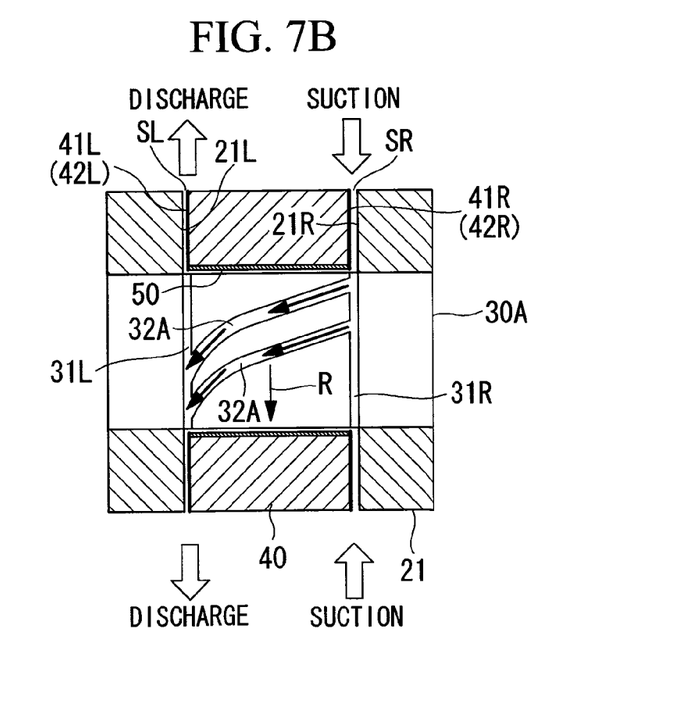
FIG. 7B shows the second embodiment of the planetary bearing structure of the invention, and is a sectional view of an essential portion showing the planetary bearing structure.
Figure 7C:
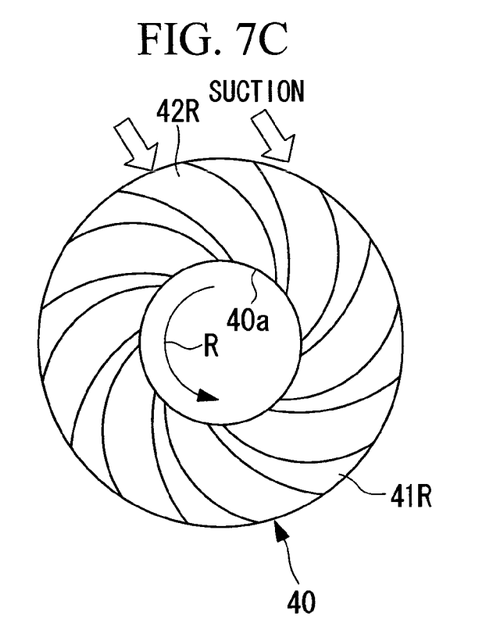
FIG. 7C shows the second embodiment of a planetary bearing structure according to the present invention, and is a right side view of a planetary gear shown in FIG. 7B.

A second embodiment of the planetary bearing structure according to the invention will be described based on FIGS. 7A, 7B and 7C. The same portions as those of the previous embodiment and its modification are designated with the same symbols, and detailed description thereof will be omitted.

An oil supply groove 32A of this embodiment is formed by inclining the oil supply groove 32 of the planetary pin 30 formed in the axial direction in the previous embodiment in the rotation direction of the planetary gear 40 toward an outlet side gap from an inlet side gap. That is, in the illustrated configuration example, the oil supply groove 32A which is inclined in the rotation direction of the planetary gear 40 shown with arrows R in the drawings toward the outlet side gap SL from the inlet side gap SR is provided on an outer peripheral surface of the planetary pin 30.

By providing the oil supply groove 32A in a planetary pin 30A, a flow of lubricant oil which is sucked from the sucking side gap SR and which flows out from the discharging side gap SL is accelerated by the oil supply groove 32A which inclines in the rotation directions of the planetary gear 40 and the slide bearing 50. That is, the oil supply groove 32A accelerates a flow of lubricant oil in the direction sucking and discharging the lubricant oil such that the oil supply groove 32A is dragged by rotation on the side of the outer periphery.

As a result, according to the lubricant oil passage formed such that lubricant oil sucked and introduced from the right gap SR passes between the planetary pin 30 and the slide bearing 50 and the lubricant oil is discharged from the left gap SL, the lubricant oil flows more smoothly.

<Third Embodiment>

A third embodiment of the planetary bearing structure according to the invention will be described based on FIGS. 8A, 8B and 8C and 9. The same portions as those of the previous embodiment and its modification are designated with the same symbols, and detailed description thereof will be omitted.

In this embodiment, in the gear end surfaces 41L and 41R and the opposed wall surfaces 21L and 21R forming the pair of left and right gaps SL and SR, the spiral grooves 42L and 42R are provided in gap forming surfaces of one of them like the previous embodiment, but orientations thereof are the same direction, and both of them are sucking side gaps. The illustrated configuration example is different from that of the previous embodiment in that spiral groove 42L' and 42R are formed in left and right both ends of the planetary gear 40, orientation of the spiral groove 42L' provided in the left gap SL is opposite from that of the spiral groove 42L of the embodiment shown in FIGS. 1A and 1B. That is, the orientations of the spiral groove 42L' and 42R formed in the left and right both ends of the planetary gear 40 are in the same direction in the rotation directions of the planetary gear 40 and the slide bearing 50.

Figure 8A:
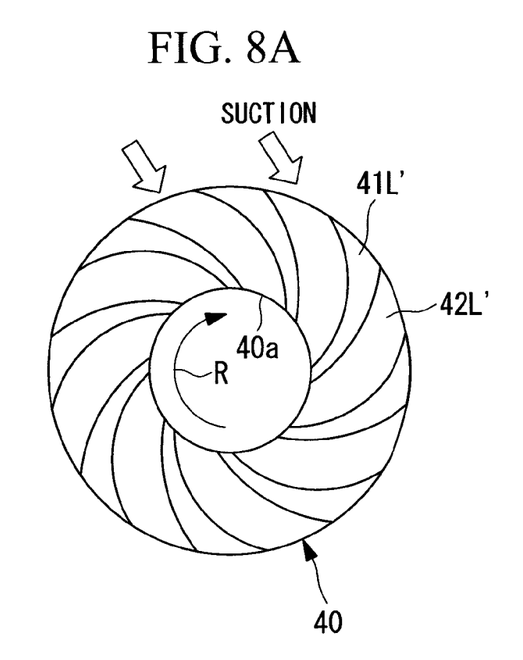
FIG. 8A shows a third embodiment of a planetary bearing structure according to the present invention, and is a left side view of a planetary gear shown in FIG. 8B.
Figure 8B:
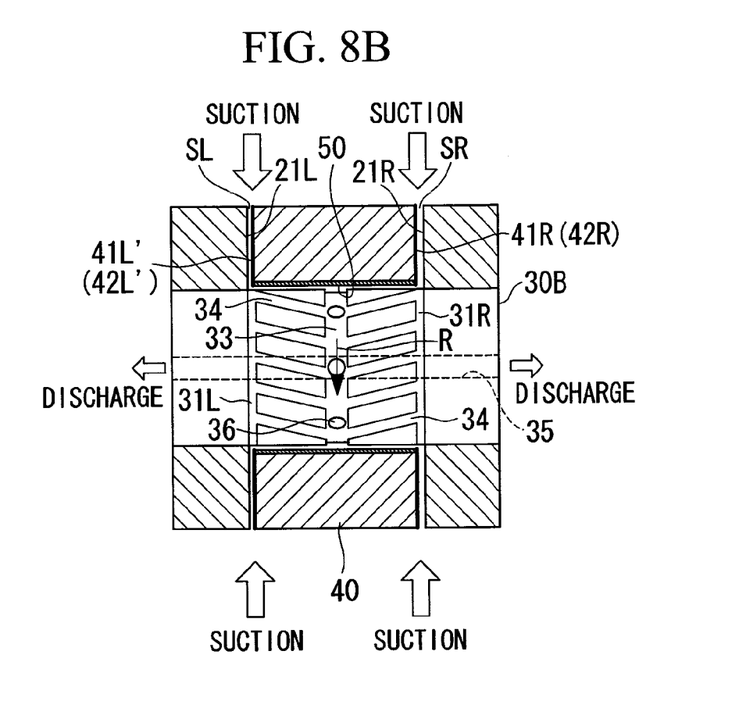
FIG. 8B shows the third embodiment of the planetary bearing structure of the invention, and is a sectional view of an essential portion showing the planetary bearing structure.
Figure 8C:
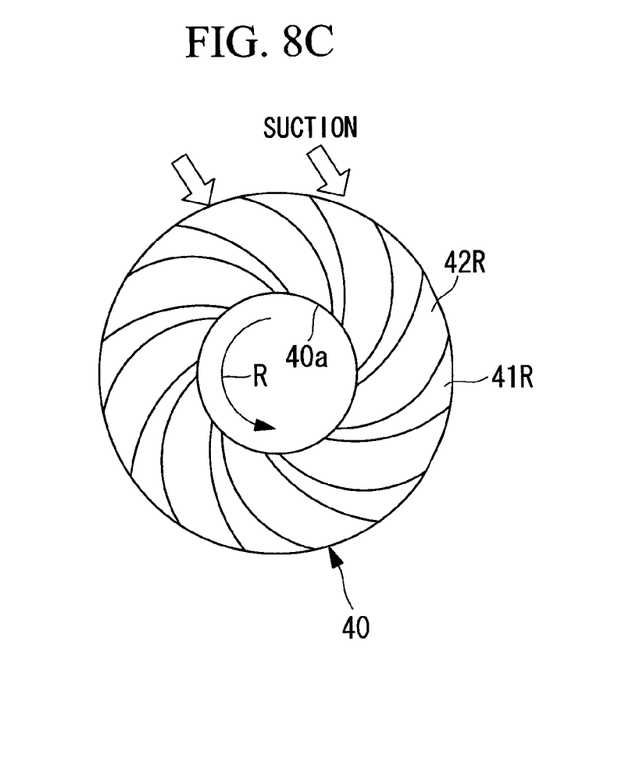
FIG. 8C shows the third embodiment of a planetary bearing structure according to the present invention, and is a right side view of a planetary gear shown in FIG. 8B.
Figure 9:
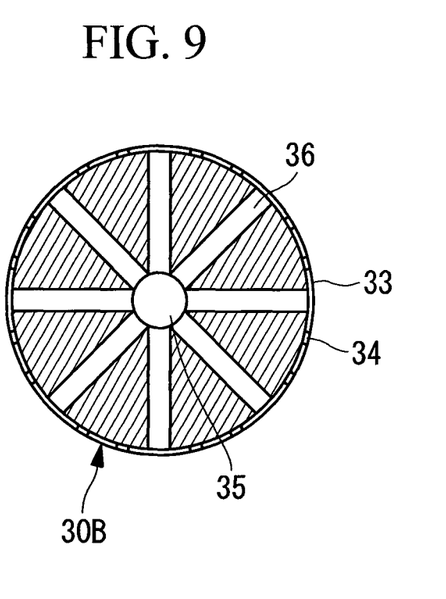
FIG. 9 is a sectional view of a planetary pin shown in FIG. 8B.

A pair of left and right circumferential grooves 31L and 31R which are formed at positions in an axial direction substantially matching with the gaps SL and SR and which are continuous in the circumferential direction, a drain oil groove 33 which is formed at a substantially intermediate position of the circumferential grooves 31L and 31R and which is continuous in the circumferential direction, and a herringbone groove 34 which connects the circumferential grooves 31L and 31R and the drain oil groove 33 with each other are formed in the outer peripheral surface of the planetary pin 30B. A plurality of drain oil holes 36 radially penetrating from the drain oil flow path 35, which penetrates through the planetary pin 30B in the axial direction, to the drain oil groove 33 at an axially center position of the planetary pin 30B. In the illustrated configuration example, eight drain oil holes 36 are formed at a pitch of 45°, but the invention is not limited to this.

When the gaps SL and SR take an oil bath in the lubricant oil by the rotation of the carrier 21, lubricant oil is introduced by the pump function of the spiral groove 42L' and 42R from the left and right gaps SL and SR both of which are on suction sides. After the lubricant oil flows from the circumferential grooves 31L and 31R to the drain oil groove 33 through the herringbone groove 34, the lubricant oil is discharged outside from the drain oil hole 36 opening at the drain oil groove 33 through the drain oil flow path 35. That is, there is formed a lubricant oil passage through which the lubricant oil sucked and introduced from the gaps SL and SR is guided to the drain oil groove 33 from the circumferential grooves 31L and 31R through the herringbone groove 34, and guided from the drain oil hole 36 to the drain oil flow path 35, and flows out from the planetary bearing structure. The lubricant oil which flowed out from the drain oil flow path 35 is returned to a lubricant oil reservoir (see lubricant oil surface Lo in FIG. 3) provided in a lower portion of the housing 24 in which the planetary gear 40 revolves together with the carrier 21, and the lubricant oil re-circulates.

According to this planetary bearing structure, the pair of left and right gaps SL and SR take the oil bath in the lubricant oil, the gaps SL and SR becomes sucking side and therefore, the amount of lubricant oil which is sucked from both the gaps SL and SR and supplied to the lubricant oil passage can be increased. Further, since the herringbone groove 34 is formed in the outer peripheral surface of the planetary pin 30B and the lubricant oil is guided to the drain oil hole 36 of the drain oil groove 33, the lubricant oil is substantially uniformly supplied between the outer peripheral surface of the planetary pin 30B and the sliding surface of the slide bearing 50 over the entire periphery, and a sufficient amount of lubricant oil can be obtained and reliable lubrication can be carried out without carrying out the forcible lubrication.

According to these embodiments, since the lubricant oil is supplied utilizing the pump function formed by the spiral grooves 42L and 42R, the conventional forcible oil supply using the lubrication oil pump is unnecessary to lubricate the planetary bearing using the slide bearing for the bearing section. That is, by such an easy and simple configuration that the spiral grooves 42L and 42R are formed in one surfaces of the gaps (grooves) SL and SR formed between the carrier 21 and the planetary gear 40, the pump function to take in and discharge lubricant oil when taking the oil bath can be obtained. Therefore, it is possible to inexpensively provide the planetary bearing structure capable of reliably supplying oil to the sliding surface of the slide bearing 50 and lubricating the sliding surface.

Therefore, if this planetary bearing structure is applied to the gear box 10 or the like of the wind power generator 1, the costs of the gear box 10 and the wind power generator 1 can be reduced, and this is effective to enhance the reliability and durability by the reliable lubrication.

The invention is not limited to the embodiments, and the invention can appropriately be modified within a range not departing from a subject matter of the invention.

REFERENCE SIGNS LIST 1 wind power generator
3 nacelle
4 rotor head
5 wind turbine blade
9 main shaft 10 gear box
11 output shaft
12 generator
20 planetary gear device (planetary gear box)
21 carrier
21L, 21R opposed wall surfaces
22 output shaft
23 sun gear
24 housing
25 internal gear
30, 30A, 30B planetary pin
31L, 31R circumferential groove
32, 32A oil supply groove
33 drain oil groove
34 herringbone groove
35 drain oil flow path
36 drain oil hole
40, 40A planetary gear
41L, 41L', 41R gear end surface
42L, 42L', 42R spiral groove
43 separate member
50 slide bearing
SL, SR gap

The invention claimed is:

1. A planetary bearing structure, comprising:
a planetary pin to be fixed to a carrier; and
a planetary gear having two end surfaces perpendicular to an axial direction of the planetary gear and having a slide bearing to be mounted on an inner peripheral surface of a shaft hole, the planetary pin being configured to
turnably support the planetary gear through the slide bearing, and
rotate in such an manner that a first gap and a second gap are formed between the two end surfaces of the planetary gear and opposed wall surfaces of the carrier that face the two end surfaces of the planetary gear, wherein
a pair of spiral grooves are formed on surfaces selected from the two end surfaces and the opposed wall surfaces defining the first and second gaps and are oppositely oriented to each other, and
a lubricant oil passage is formed in which, when the gaps take an oil bath in lubricant oil by rotation of the carrier, lubricant oil sucked from the first gap passes between the planetary pin and the slide bearing and is discharged from the second gap.

2. The planetary bearing structure according to claim 1, further comprising:
a pair of circumferential grooves which are formed in an outer peripheral surface of the planetary pin at positions substantially matching, in the axial direction, positions of the first and second gaps, respectively, wherein the circumferential grooves are continuous in a circumferential direction; and
an oil supply groove which is formed in the outer peripheral surface of the planetary pin in the axial direction connects the circumferential grooves with each other.

3. The planetary bearing structure according to claim 2, wherein the oil supply groove is inclined in a rotation direction of the planetary gear from the first gap to the second gap.

4. The planetary bearing structure according to claim 1, wherein cross-sectional areas of the spiral grooves are gradually reduced in a sucking direction or a discharging direction of the lubricant oil.

5. The planetary bearing structure according claim 1, wherein the spiral grooves are formed as members which are separate from the two end surfaces of the planetary gear or the opposed wall surfaces.

6. A planetary bearing structure, comprising:
a planetary pin to be fixed to a carrier; and
a planetary gear having two end surfaces perpendicular to an axial direction of the planetary gear and having a slide bearing to be mounted on an inner peripheral surface of a shaft hole, the planetary pin being configured to
turnably support the planetary gear through the slide bearing, and
rotate in such an manner that a pair of gaps, as suction side gaps, are formed between the two end surfaces of the planetary gear and opposed wall surfaces of the carrier that face the two end surfaces of the planetary gear, wherein
a pair of spiral grooves are formed on surfaces selected from the two end surfaces and the opposed wall surfaces defining the pair of gaps and are oriented in the same direction,
in an outer peripheral surface of the planetary pin,
a pair of circumferential grooves are formed at positions substantially matching, in the axial direction, positions of the first and second gaps, respectively, wherein the circumferential grooves are continuous in a circumferential direction,
a drain oil groove is formed at an intermediate position of the circumferential grooves and is continuous in the circumferential direction, and
a herringbone groove which connects the circumferential grooves and the drain oil groove with each other,
a plurality of drain oil holes radially penetrate through the drain oil groove from a drain oil flow path penetrating through the planetary pin at an axial center position of the planetary pin, and
a lubricant oil passage is formed in which, when the suction gaps take an oil bath in lubricant oil by rotation of the carrier, lubricant oil sucked from the suction gaps passes through the herringbone groove from the circumferential grooves and flows into the drain oil groove and then, the lubricant oil is discharged from the drain oil holes through the drain oil flow path.

7. The planetary bearing structure according to claim 6, wherein cross-sectional areas of the spiral grooves are gradually reduced in a sucking direction or a discharging direction of the lubricant oil.

8. The planetary bearing structure according to claim 6, wherein the spiral grooves are formed as members which are separate from the two end surfaces of the planetary gear or the opposed wall surfaces.

* * * * *